United States Patent [19]
Elmslie

[11] 3,821,990
[45] July 2, 1974

[54] FARM IMPLEMENT

[76] Inventor: Frederick Ellis Elmslie, 174 Union Blvd., Kitchener, Ontario, Canada

[22] Filed: Oct. 24, 1972

[21] Appl. No.: 300,104

[30] Foreign Application Priority Data
Oct. 29, 1971  Canada .............................. 126400

[52] U.S. Cl. ............................ 172/292, 180/14 A
[51] Int. Cl. ............................................ A01b 51/02
[58] Field of Search .......... 172/292, 286, 291, 285, 172/258, 114, 671, 670; 180/14 R, 14 D, 15 V, 66 F, 14 A

[56] References Cited
UNITED STATES PATENTS
1,198,698   9/1916   Buchanan ........................ 172/292
FOREIGN PATENTS OR APPLICATIONS
408   1/1915   Great Britain ..................... 172/292
269,078   7/1913   Germany ........................... 172/292

*Primary Examiner*—Stephen C. Pellegrino
*Attorney, Agent, or Firm*—Fetherstonhaugh & Co.

[57] ABSTRACT

A trailer type soil cultivator such as a plow or the like is provided with a supplementary soil traction device in the form of a driven wheel which permits a relatively small tractor device to operate with a large capacity cultivating device. The traction wheel carries its own hydraulic motor and hydraulic power is supplied by means of a hydraulic pump which is coupled to the supplementary power output shaft of a conventional tractor. The frame of the cultivator device may be formed in a number of sections arranged in a side-by-side relationship, one of the sections having a hitch for connecting it to a tractor and at least some of the sections having a soil traction member mounted therein so that the assembled frame may be much wider than that which could have previously been pulled by a tractor.

29 Claims, 9 Drawing Figures

FARM IMPLEMENT

This invention relates to trailer type soil cultivators.

In particular, this invention relates to improvements in trailer type ground tilling devices of the type normally pulled by a farm tractor such as a multiple bottom plow of the conventional type including disc plows, chisel plows, harrows and the like.

Whereas powered road-going trailers for road-going vehicles have previously been proposed, the practice has been to supply power to an existing wheel or wheels of a trailer so as to give a more even distribution of the load on the various driven wheels.

In agricultural equipment, plow manufacturers have for a considerable period of time offered large multiple blade plows which can only be used successfully by towing them behind powerful tractors. The difficulties involved in towing large plows have been known for a considerable period of time and the only way in which a farmer can utilize these large plows is to obtain a large and powerful tractor. The large tractors which are presently available are very expensive machines and the usefulness of these large tractors is quite limited on a farm. Generally, the majority of operations carried out on a farm can be successfully conducted with the aid of a tractor which is much less powerful, lighter in weight, and less expensive than those required for use with a very large plow and for this reason most farmers who own large tractors also own the more normal lightweight tractors.

Numerous attempts have been made to increase the traction of tractors. These attempts include the fitting of additional wheels to the rear axle of the tractors so that four wheels are mounted at the rear axle of the tractor, the provision of devices for transferring the weight of the plow to the rear wheel of the tractor, filling the tractor tires with fluid, wheel weights and counterbalance weights on the front end of the tractors. However, it has been found that even with these additional wheels sufficient traction cannot be attained. Generally a field which is to be plowed has a surface coating of grass, mud or the like and the tractor rides on this surface. It has been found that the natural juices which are present in grass and the like tend to act as a lubricant between the tire and the soil so that the traction wheel of the tractor tends to skid or spin on the grass surface when the load of the plow becomes excessive.

The problems of providing adequate traction for a plow would not be overcome by powering the existing wheels of a plow as these wheels are used solely for supporting the frame of the plow and are fitted with tires which do not have a suitable tread portion for providing traction. Furthermore, the wheels of the plow are relatively small and again these small wheels would not provide adequate traction when driven. In addition, the rear wheel of a plow is usually mounted so that it will castor to permit free turning of the plow at the end of a furrow and if this freely pivoted wheel were driven, the direction in which the drive force could be applied would not necessarily be the tilling direction required by the power blades.

The conventional farm tractor has long been provided with a power take off output shaft which may be used to drive any other farmyard machine which is not provided with its own source of power. Despite the fact that this additional output shaft has been available for some considerable time, no effort has been made to utilize this source of power to provide additional traction to soil tilling device such as a plow or the like and as a result when a tractor is being used to pull a plow this additional source of power is untapped.

The present invention overcomes the difficulties of the prior art described above and provides a trailer type soil cultivator which incorporates a soil traction member which considerably increases the traction capacity of a tractor-plow combination.

The present invention overcomes the difficulties associated with the prior art in attempting to provide additional traction to a plow by providing a soil traction device mounted on the plow. Preferably the traction device is in the form of a wheel which has a tread surface of a substantially greater diameter than that of the wheels normally mounted on a plow. In addition, the traction wheel is preferably mounted at the rear end of the frame of the plow so that the tread surface will ride in the last furrow formed by the plow. The soil uncovered by the plow is generally firmly packed and provides a much superior base for the traction wheel to operate on than that provided by the grassy surface, or a surface which is muddy, slick or greasy as a result of moisture on the surface of the field on which the traction wheels of the tractor operate. The location of the traction wheel on the hard bottom of the last furrow is even more desirable than merely locating the wheel on the tilled soil as the stability of the tilled soil has been broken by the tilling action and, therefore, the driving wheels are inclined to sink into the tilled soil in an attempt to obtain traction and in so doing become entrenched in the soft soil.

To overcome problems which would be encountered by simply providing a power drive to the castor mounted rear wheel of a plow, the present invention provides a releasable locking device which permits the traction device to be locked in an operative position in which it will drive the frame in the required direction to achieve the required tilling action of the blades while being releasable to permit the traction member to pivot about a vertical axis to permit the frame to turn freely as the tractor turns.

According to an embodiment of the present invention, a trailer type soil cultivator comprises a frame having a ground tilling member mounted thereon and hitch means for connecting the frame to a tractor. A soil traction member is mounted on the frame in a soil engaging operative position and aligned to move the frame in a direction to provide the required tilling action at the tilling members. The traction device is provided with hydraulic drive means and connecting means are provided for connecting the hydraulic drive means to a hydraulic power source.

According to a further embodiment of the present invention, the soil traction member is in the form of a wheel having an external diameter of at least 30 inches, and preferably at least 48 inches, and a traction tread width of at least 8 inches, and preferably at least 12 inches.

According to a still further embodiment of the present invention, the traction wheel member is mounted at the rear end of the frame and is adapted to pivot about a substantially vertical axis. Releasable locking means is provided for locking the wheel in the required aligned position and for releasing the wheel to pivot about the vertical axis.

According to yet another embodiment of the invention, the frame is formed of at least two sections which are coupled together in a side-by-side relationship, one section being adapted to be connected to a tractor and at least one of said sections having tractor means as aforesaid mounted thereon.

The invention will be more clearly understood after reference to the following detailed specification read in conjunction with the drawings wherein.

Figure 1:
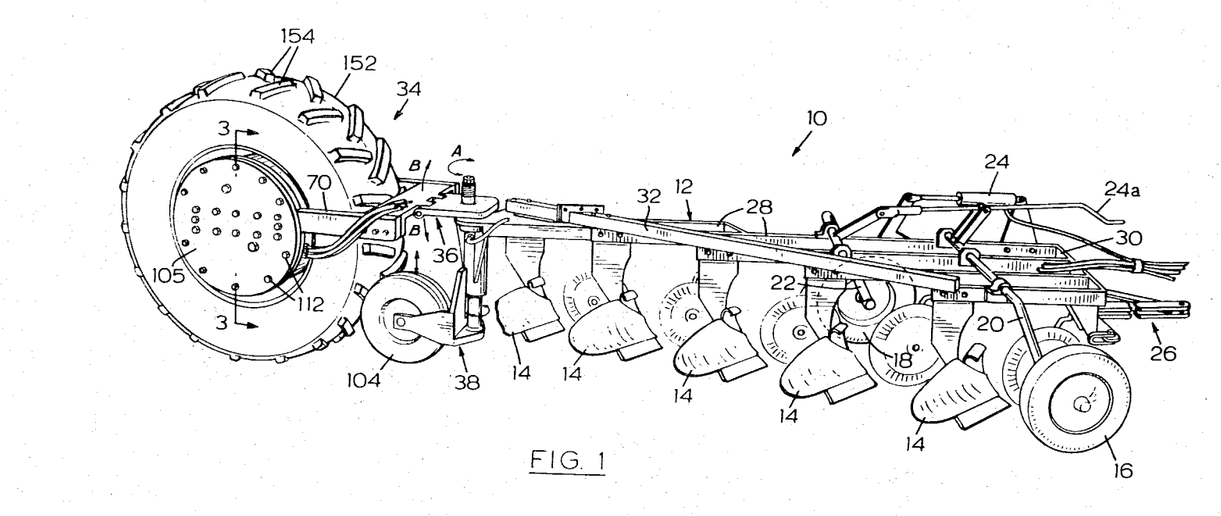
FIG. 1 is a pictorial view of a plow with a soil traction device according to an embodiment of the present invention mounted thereon.

With reference to the drawings, the reference numeral 10 refers generally to a trailer type of ground tilling device according to an embodiment of the present invention. In the embodiment illustrated, the ground tilling device is in the form of a plow and includes a frame which is generally identified by the reference numeral 12 and a plurality of ground tilling plow blades 14. It will be understood that in order to simplify the illustration of the plow, elements such as springs which permit the plow blades to be deflected upon striking an immovable obstacle and hydraulic jacks for raising and lowering the blades relative to the frame have been omitted. A plow of the type illustrated is manufactured by Massey-Ferguson Limited and identified by Series No. MF-84. The wheels 16 and 18 which are mounted at the front end of the plow on shafts 20 and 22 may be moved relative to the frame by manipulation of the conventional hydraulic cylinder 24 and hand screw crank 24A to trim or level the plow so that the height of the wheels relative to the frame and their position relative to one another may be adjusted. By adjusting the height of the wheels in this manner, the depth of penetration of the blades can be controlled. The trailer is provided with a conventional hitch arrangement 26 at the front end. The hitch 26 is adapted to be connected to a standard trailer hitch on a tractor in a known manner.

The standard plow frame consists of a plurality of longitudinally extending ribs 28 connected at their forward end by an end plate 30 and at their rear end by an angularly inclined arm 32.

The plow and frame assembly described above is typical of a plow to which the soil traction device of the present invention may be attached. However, it will be understood that various other soil cultivating devices including different plow constructions including disc plows and also devices such as harrows, seeders, fertilizers, sprayers and the like, including harvesters of various types, may be substituted for the plow assembly described above.

The novel construction of the present invention includes a soil traction wheel 34 and a sub-frame 36 which serves to connect the wheel to the plow frame.

Figure 2:
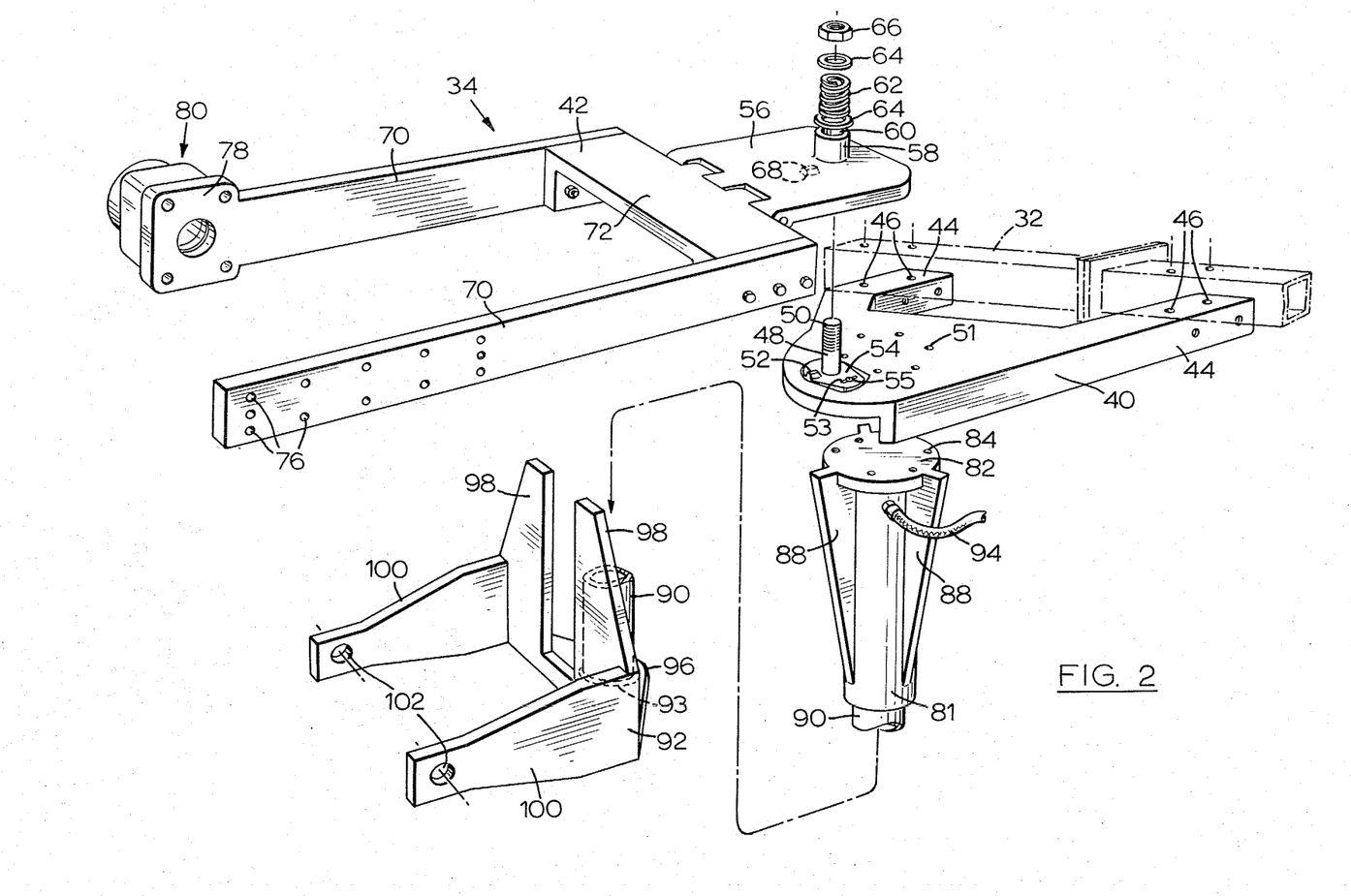
FIG. 2 is an exploded detailed view of the sub-frame used to mount the traction wheel and the castor wheel on the frame of the plow.

The sub-frame 36 is shown in enlarged detail in FIG. 2 of the drawings. The sub-frame 36 consists of an inner member 40 and an outer member 42. The inner member 40 includes a pair of arms 44 which are bolted to the angularly inclined frame member 32 of the plow frame through passages 46.

A pivot pin 48 is mounted towards the rear end of the first portion of the sub-frame and is provided with a threaded upper portion 50. A lug 52 is mounted on a plate 54 which is secured to the inner member 40 of sub-frame 36 at the lower end of the pin. The lug 52 projects upwardly from the plate 54. It will be noted that the inner member 40 of the sub-frame 36 is mounted adjacent the rear end of the plow frame so that the vertical axis of the pivot pin 48 is closely adjacent to the last plow blade.

The second portion 42 of the sub-frame includes a first plate member 56 which has a hollow sleeve 58 mounted thereon. A bore 60 extends through the sleeve and the plate 56 and is adapted to receive the pivot pin 48 in a close fitting sliding relationship. A spring 62 together with washers 64 and lock nut 66 fit over the upper end of the pivot pin 48 and the lock nut 66 threadably engages the threaded upper portion 60 of the pivot pin so as to apply a compressive force to the spring. A small recess 68 is formed in the underside of the plate 56 so as to receive the lug 52 of the plate 54. The action of the spring 62 serves to press the plate 56 downwardly into engagement with the first portion 40 of the sub-frame and serves to retain the lug 52 in the slot 68. It will be apparent that when a substantial transverse force is applied to the assembly, the lug 52 will force the plate 56 to compress the spring 62 so that the plate will rise to release the lug 52 from the recess 68 and thereby permit the outer member 42 of the sub-frame to pivot about the vertical axis of the pivot pin 48. It will be apparent that when the sub-frame returns to the required aligned position, the lug 52 will again engage the slot 68 and serve to hold the two portions of the sub-frame in the required alignment. A slot 53 is formed in the plate 54 and the plate is locked in position by means of an anchor screw 55 which is releasable to permit angular adjustment of the position of the lug 52 so that the aligned position of the traction device can be adjusted.

The outer sub-frame member 42 also includes a second portion which consists of a pair of arms 70 and a bridge member 72. The plate 56 is pivotally mounted to the bridge member 72 so that the second portion of the sub-frame is free to pivot about a horizontal transverse axis in the direction of the arrows B in FIG. 1.

One of the arms 70 is provided with a plurality of passages 76 which extend therethrough and serve to mount the traction device as will be described hereinafter. The other arm 70 has an enlarged portion 78 at the rear end thereof which is adapted to support a bearing assembly generally identified by the reference numeral 80.

Whereas in the Massey-Ferguson MF-84 pull type plow it is customary to provide a rear wheel on the plow, I have found that it is desirable to remove the standard rear wheel and to substitute a castor wheel such as that identified by the reference numeral 38. The advantage of providing this wheel is that it can be mounted closer to the body of the frame and it may be adjusted hydraulically in a substantially vertical plane and, therefore, reduces the amount of space occupied by the customary rear of castoring wheel. In the embodiment illustrated, the improved wheel includes a hydraulic cylinder 81 which has an end plate 82 mounted at the upper end thereof and adapted to be secured to the sub-frame 40 by bolting the end plate 82 to the sub-frame 40 through passages 84 formed in the end plate and passages 51 formed in the sub-frame. The hydraulic cylinder 80 is provided with three longitudinally extending triangular shaped reinforcing ribs 88 which serve to add rigidity to the cylinder and which also serve to limit the angle to which the wheel may castor as will be described hereinafter. A shaft 90 extends out of the cylinder 80 and is connected at its lower end to a thrust bearing 93 which is mounted in the lower end 90 of the frame. Hydraulic fluid is transmitted to the upper end of the cylinder 80 by means of a supply line 94 and the shaft 90 may be moved up and down by increasing or decreasing the pressure of the hydraulic fluid supplied to the cylinder. The wheel 92 includes a generally triangular bottom plate 96 to which the lower end of the thrust bearing 93 is secured and a pair of face plates 98 which project upwardly therefrom. The inner edges of the face plates 98 are spaced a sufficient distance from one another to provide a clearance for the hydraulic cylinder. The plates 98 are, however, sufficiently closely spaced to ensure that when the frame 92 pivots about the axis of the shaft 90, the plates 98 will strike the reinforcing webs 88 to limit the angular movement of the frame 92 so that the castor wheel cannot castor through 360°. The frame 92 also includes a pair of arms 100, each formed with a passageway 102 to receive suitable bearings for supporting the shaft of the wheel member 104 (FIG. 1). To facilitate backing up of the mechanism, the frame 92 may be provided with suitable stop blocks (not shown) which may be inserted prior to backing up to further limit the extent to which the wheel 104 is permitted to pivot about its vertical axis.

Figure 3:
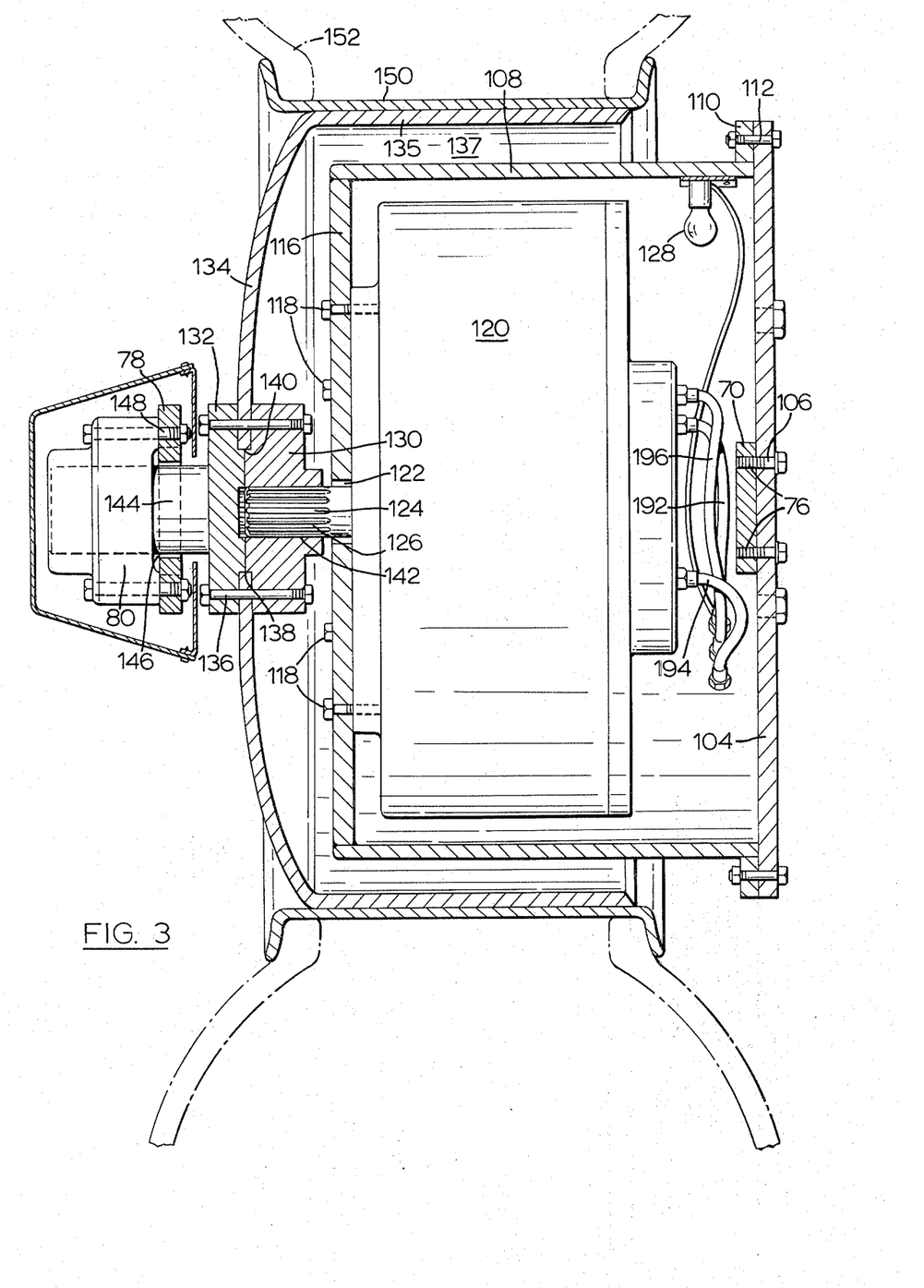
FIG. 3 is a sectional view taken along the line 3—3 of FIG. 1.

The structure of the soil traction wheel and hydraulic drive means will be more clearly understood with reference to FIG. 3 of the drawings. The enlarged portion 78 of one arm 70 and the opposite arm 70 are shown in section in FIG. 3. A large disc 105 is mounted on the arm 70 by bolts 106 which are threadably mounted in the passages 76 of the arm 70. A drum 108 has a flange 110 bolted to the peripheral edge of the disc 105 by a plurality of bolts 112 as shown in FIGS. 1 and 3. An end plate 116 is mounted on the upper end of the drum 108 and a hydraulic motor 120 is secured to the end plate 116 by a plurality of bolts 118. A suitable hydraulic motor for use in the traction device is manufactured by Chamberlain Industries Ltd. of London, England and identified by the trade mark STAFFA hydraulic pump B 80. The hydraulic motor 120 has an output shaft 124 mounted on the axis of the drum 108 and projecting through a passageway 122 formed in the end plate 116. The outer end of the shaft 124 is formed with a plurality of splines 126. A small illuminating bulb 128 is mounted within the hollow chamber of the drum 108 to facilitate the detection of leakage of hydraulic fluid from various fluid couplings and seals mounted within the chamber.

A hub consisting of an inner circular plate 130 and an outer circular plate 132 is connected to the wheel 134 by means of a plurality of bolts 136. The wheel plate 134 has a circular central passage 138 formed therein and the inner plate 130 has a boss 140 and the outer plate 132 has a boss 141 which project into the recess 138 in a close fitting relationship. The inner plate 130 also has a central passage 142 formed with a plurality of splines so as to receive the splined shaft 124 in driving engagement. A shaft 144 is formed integrally with the outer plate 132 and projects outwardly therefrom in axial alignment with the axis of the splined output shaft 124 of the motor 120. The shaft 144 extends through passageway 146 formed in the enlarged portion 78 of the arm 70. The passage 146 is a clearance fit with respect to shaft 144. The outer end of the shaft 144 is mounted for rotation in bearing 80 which is provided with suitable roller bearings (not shown). The bearing 80 is supported on the enlarged portion 78 of the arm 70 by a plurality of bolts 148 and the bearing 80 serves as one of the support bearings for the wheel while the bearings provided in the motor 120 serve as the other bearings for supporting the rotation of the wheel.

The wheel plate 134 has a transversely extending portion 135 which defines a wheel cavity 137 within which the drum 108 is mounted. A conventional wheel rim 150 is secured to the transverse portion 135 of the wheel plate so that a tire 152 may be mounted thereon.

In selecting a suitable wheel size and tire size, it is important to ensure that the wheel and tire will be sufficient to provide a substantial traction when in use. Small wheels such as those presently mounted on plow frames would not have the ability to provide sufficient traction for most plowing operations even if these wheels were provided with suitable drive means. To achieve the required traction, the external diameter of the tire should be at least 30 inches and preferably at least 48 inches and the tread width should be at least 8 inches and preferably at least 12 inches. Furthermore, it is important to provide a tread pattern of the type which will ensure that adequate traction will result. Again, conventional tires mounted on a plow have a tread which is suitable for ensuring that they will follow a path established by the tractor but they are quite unsuitable for driving traction purposes. A tread pattern such as that shown on the tire 152 in FIG. 1 of the drawings is suitable for providing required traction. In this construction, a plurality of lugs 154 are circumferentially spaced from one another a substantial distance and they extend substantially transversely of the tread surface so that they provide considerable traction in use.

Figure 4:
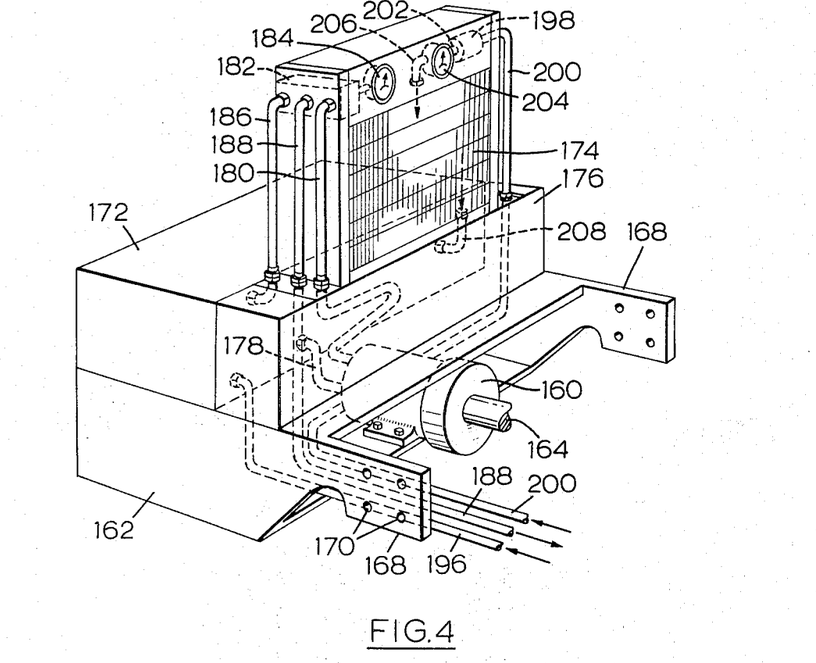
FIG. 4 is a pictorial view of a hydraulic power source according to an embodiment of the present invention.

To provide the source of hydraulic power, a pump 160 is mounted on a support frame 162 and is provided with a drive shaft 164 which is coupled to the drive shaft 166 (FIG. 5) of the conventional supplementary power source of a tractor. A suitable pump is the DELAVAN (Trade Mark) pump No. P.V. 320R-2704. The frame 162 has a pair of arms 168 provided with a plurality of bolt holes 170 which are used to bolt the frame 162 to the chassis of a tractor as shown in FIG. 6. A hydraulic fluid reservoir tank 172 is mounted on the frame 162 and a radiator type cooling device 174 is mounted on and projects upwardly from a frame 176 which is carried by the frame 162. Hydraulic fluid is supplied to the pump 164 by means of conduit 178 and hydraulic fluid under pressure is discharged from the pump by way of conduit 180.

Figure 5:
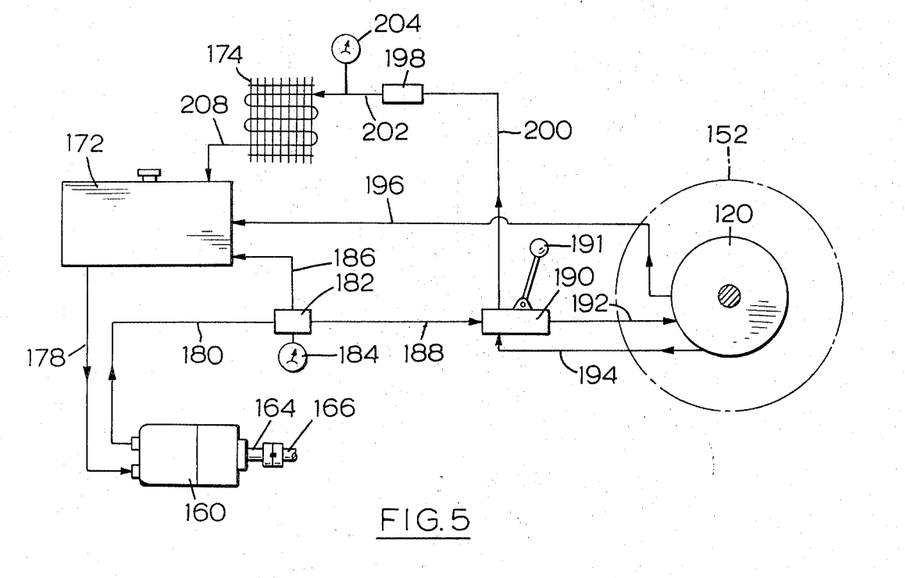
FIG. 5 is a diagrammatic illustration of the hydraulic circuit employed in the device of the present invention.
Figures 6, 7:
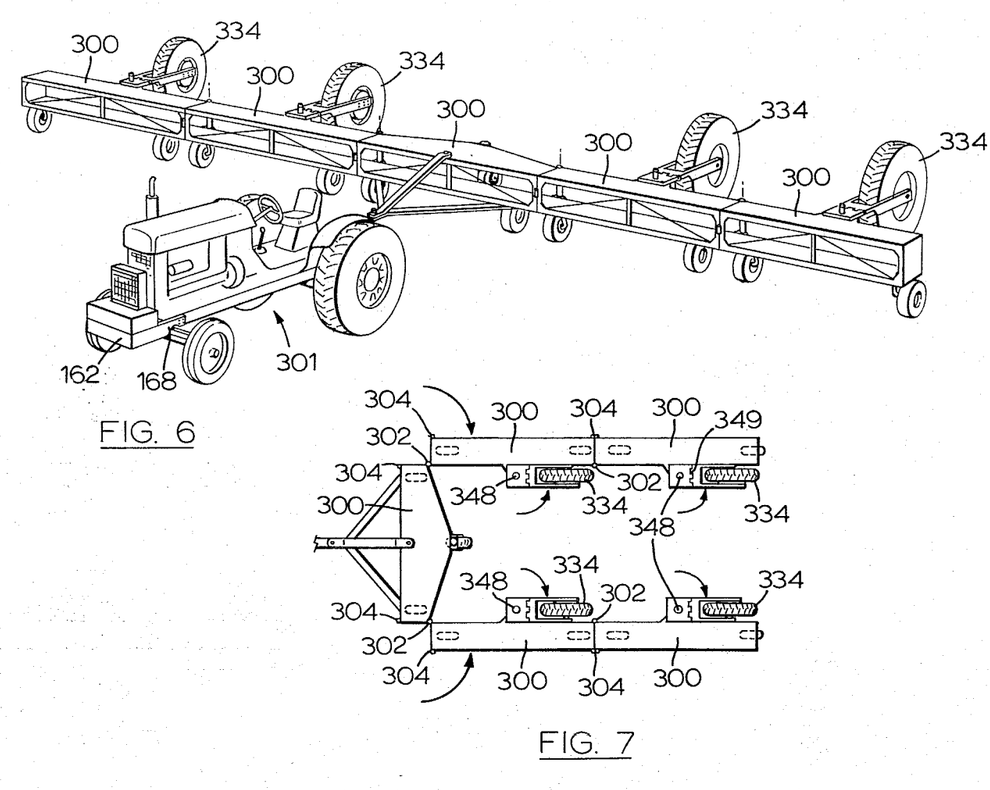
FIG. 6 is a pictorial view of a plurality of farm instruments mounted in a side-by-side relationship, each provided with a soil traction device according to the present invention.
FIG. 7 is a plan view of the device of FIG. 6 in a position suitable for driving along a roadway.

The hydraulic circuit will be more clearly understood with reference to FIGS. 4 and 5 of the drawings. As shown in FIG. 4 of the drawings and as previously described, reservoir 172 is connected to pump 160 by means of a conduit 178 and the pump 160 is connected to a relief valve 182 by means of conduit 180. The pressure relief valve 182 is provided with a pressure gauge 184 and conduit 186 connects the pressure relief valve to the reservoir 172 such that when the pressure of the fluid in the line 180 exceeds a predetermined pressure, the relief valve will be activated to permit hydraulic fluid to be returned to the reservoir by way of conduit 186. Conduit 188 connects the relief valve 182 to a three-way control valve 190. A suitable control valve is produced by Abex Industries of Canada Limited and identified by ABEX (Trade Mark) directional control DID12-33-408-03-OS. The control valve 190 is connected to the input passage of the motor 120 by means of a conduit 192 (FIGS. 3 and 5). A conduit 194 connects the output passage of the motor 120 to the control valve and the bleed conduit 196 connects the bleed output passage of the motor to the reservoir 172. The hydraulic fluid which returns to the control valve from the motor passes through a filter 198 through conduit 200 (FIGS. 4 and 5). A conduit 202 connects the filter 198 to a temperature gauge 204 and conduit 206 connects the temperature gauge 204 to the radiator type cooler 174. The cooler 174 is connected to the reservoir by means of conduit 208.

In operation, the source of power for the hydraulic system is the output shaft 166 of the conventional supplementary power source provided on a tractor. The shaft 166 rotatably drives the shaft 164 of the pump 160 and hydraulic fluid is drawn from the reservoir 172 by way of conduit 178 and discharged under pressure through the conduit 180. Hydraulic fluid passes through the relief valve 182 to control valve 190 and when the hydraulic motor 120 is to be driven, the lever 191 is moved to the forward drive position and pressurized hydraulic fluid passes through the conduit 192 and drives the motor 120. The hydraulic fluid returns to the control valve by way of conduit 194 and then passes through conduit 200, filter 198, conduit 202, temperature gauge 204, conduit 206 to cooler 174 and conduit 208 to return to the reservoir 172. When the hydraulic motor is not operational, the lever 192 is moved to the neutral position wherein hydraulic fluid from the pump is fed directly to the conduit 200 to return to the reservoir by way of the filter and cooler. The control valve 190 is also provided with a third positon in which the direction of flow of fluid through the conduits 192 and 194 is reversed to reverse the direction of rotation of the wheel. If an excess of pressure is encountered in the feed line 188, the pressure relief valve 182 will be activated so that pressurized fluid will be directed to the reservoir through conduit 186 and the excess of pressure in the circuit will be relieved. The bleed line 196 serves to provide the motor with the usual bleed circuit. It will be understood that the control valve 190 will be mounted on the tractor so that the supply of hydraulic fluid to the hydraulic motor 120 may be regulated by the driver of the tractor when he is seated on the driver's seat of a tractor.

Whereas in the foregoing description of the invention illustrated in FIGS. 1 to 5 of the drawings the traction wheel has been mounted on a plow, it will be understood that the traction wheel may also be mounted on various other forms of agricultural trailers including soil tilling devices and harvesting devices so that the capacity of a small tractor may be considerably increased. An example of the manner in which the capacity of small tractors may be increased is illustrated in FIGS. 6 and 7 of the drawings wherein a plurality of trailers 300 are towed by means of a single tractor 301. These trailers may be in the form of harrows, rakes, spreaders, planters, or the like. Each of the trailers is provided with a traction wheel mechanism 334 of the type previously described with respect to FIGS. 1 to 5 of the drawings so that each trailer, with the exception of the trailer which is directly coupled to the tractor, has a power source in addition to the tractor. It will be understood that the central trailer may also be provided with a traction device if this is found to be necessary in certain applications. By mounting a traction device of this type on each of the trailers, it is possible to arrange a large number of trailers in a side-by-side relationship as shown in FIG. 6 of the drawings so that a very large area of the field can be covered in one pass of the tractor. It has not previously been possible to provide very wide trailer assemblies of this type in view of the fact that the forces applied to the outermost trailer would be excessively high when transmitted to the tractor through the very long frame assembly of the combined trailer. These difficulties are overcome by providing an independent traction wheel or wheels for each of the trailers connected to a source of hydraulic fluid mounted on the tractor 301 and connected to the supplementary power output source of the tractor.

When the tractor device of FIG. 1 is to be used, the coupling mechanism 26 is connected to a tractor in a conventional manner and the various conduits of the traction device are connected in the hydraulic circuit of the system in the manner previously described with reference to FIGS. 4 and 5 of the drawings. The position of the wheels 16, 18 and 104 is determined by both the manual adjusting hand screw crank 24A and the hydraulic pressure of the fluid supplied to the cylinders 24 and 80. The setting of the wheels determines the plowing depth of the plow blades in use. The plow is then properly lined up for plowing and the tractor proceeds to tow the plow and hydraulic fluid is supplied to the traction unit 34. Under these conditions the plow moves down the field under the influence of the pulling forces provided by the tractor and under the influence of the pushing force provided by the traction device 34. It will be noted that the traction wheel is mounted on the frame of the plow so that it rides in the furrow formed by the last plow blade. In the event that the traction wheel rides over an obstacle, it is free to pivot about the horizontal axis in the direction of the arrows B so that it will ride over any obstacle in its path without lifting the plow blades. When the plow reaches the end of the furrow, the blades are elevated by the usual control mechanism and the tractor proceeds to turn pulling the trailer behind it. When the tractor blades are elevated, the force required for pulling the plow frame is considerably reduced and consequently the supply of hydraulic fluid to the traction means 34 may be cut off by actuating the control lever 192. The torque applied about the vertical axis of the pivot pin 48 as a result of the turning of the frame will be sufficient to cause the release mechanism to activate to release the lug 52 from the slot 68 to permit the traction device to pivot relative to the frame in the direction of the arrows A (FIG. 1). When the plow is realigned to commence further plowing action, the traction device will realign itself with the trailer and the locking mechanism will be reengaged. The plow blades will then be lowered and hydraulic fluid will be supplied to the traction unit and plowing will continue as previously described.

One of the problems associated with attempting to make very wide trailer devices for pulling behind a tractor is that wherever it is possible to manoeuver these devices in a farmer's field, difficulty is experienced in transporting them to and from the field. To overcome this difficulty, I have provided an assembly wherein at least the two trailers 300 which are connected to the central trailer are hingedly connected by means of a suitable hinge 302 and are provided with suitalbe cooperating latch members 304. In addition, I mount the traction devices 334 so that they may pivot about a vertical pivot pin 348 and about a transverse hinge 349. The manner in which the traction device is mounted on each of the trailers 300 is similar to that in which the traction device is mounted on the tractor rame as previously described in FIG. 2 of the drawings so that a releasable locking device is provided to ensure that the traction devices will normally be retained in an axially aligned position with respect to the towing direction of the tractor while being releasable to move to the position shown in FIG. 7 of the drawings. The hinge 349 permits the traction devices to ride over unlevel ground without unduly straining the trailers 300. The hinges 302 and latches 304 are designed to permit limited relative movement between the trailers 300 so that each of the trailers will engage the soil over which it rides independently of an adjacent trailer so that the combined trailer assembly may be towed across relatively uneven land.

When the trailer assembly is in use in a field, it is arranged in the configuration shown in FIG. 6 of the drawings and hydraulic fluid under pressure is supplied to each of the traction devices 334 so that as the tractor moves down a field, the various trailers 300 will move with the tractor and each of the traction devices 334 will assist in the driving of the trailer assembly. When the trailer assembly is to be towed along a narrow roadway, the two latches 304 which connect the central trailer to the other trailers are released and the tractor 301 is driven forward so that by disconnecting the traction units 304 from the source of hydraulic power, the central trailer will be pulled forward while the remaining trailers will be left behind to pivot about the hinges 302. The release mechanism for releasing the traction devices 334 to pivot about the pivot pin 348 will operate as a result of the torque applied by the forward motion of the central trailer and the traction wheels will pivot to the position shown in FIG. 7 of the drawings wherein they are in alignment with the direction of movement of the tractor so that the entire assembly is in a compact configuration suitable for towing along a roadway.

Figure 8:
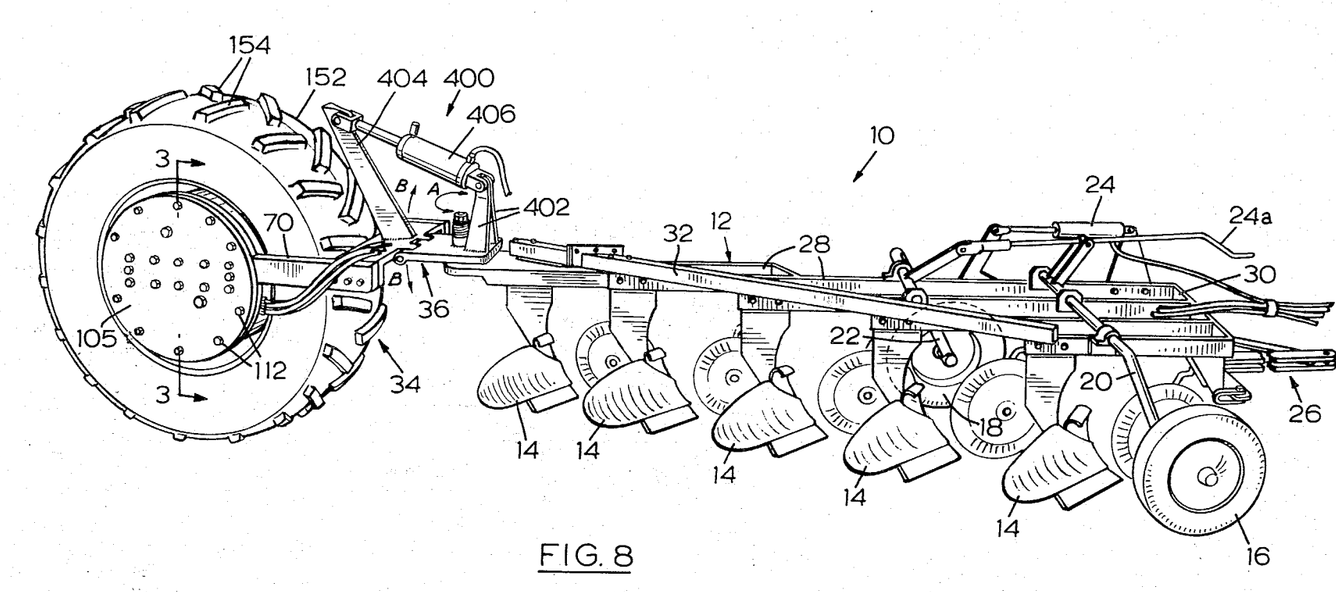
FIG. 8 is a view similar to FIG. 1 illustrating a further embodiment of the invention.
Figure 9:
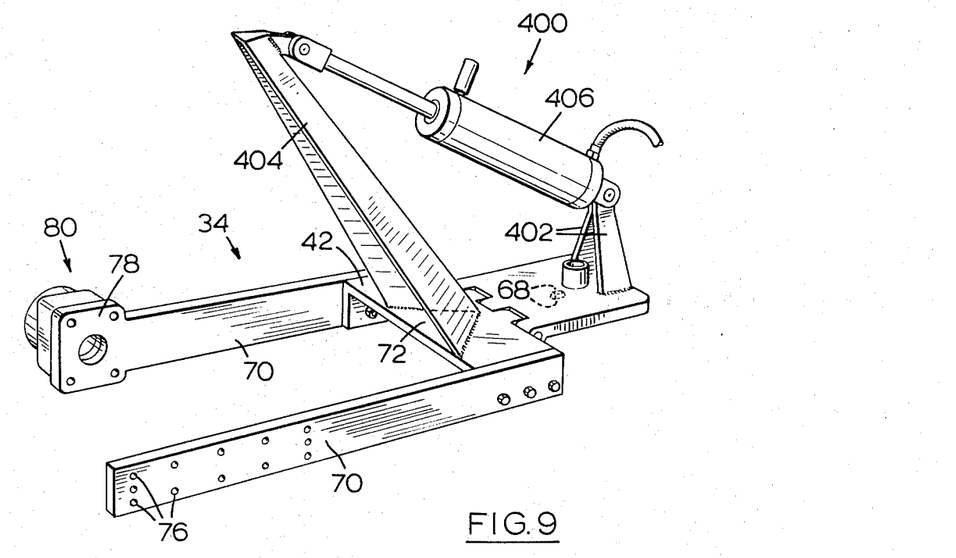
FIG. 9 is an enlarged detail view of the load transfer mechanism of FIG. 8.

A further embodiment of the present invention is illustrated in FIGS. 8 and 9 wherein the small castor wheel assembly 38 has been removed and a load transfer device 400 has been added. The load transfer device serves to transfer a portion of the plow load to the traction wheel and by adjusting the load transfer device, it is possible to adjust the load on the traction wheel. The load transfer device 400 is also used in cooperation with the front wheels of the frame to determine the depth at which the plow blades are permitted to operate in use. The transfer device includes a pair of brackets 402 mounted on the portion of the sub-frame ahead of the transverse hinge line and a bracket 404 mounted on the subframe rearwardly of the transverse hinge line. A hydraulic cylinder 406 is connected at opposite ends to the brackets 402 and bracket 404 and is operational to adjust the portion of the load which is transferred to the traction wheel. With the introduction of the load transfer mechanism, it is possible to dispense with the castor wheel as the traction wheel now combines the function of the castor wheel and the previously freely mounted traction wheel.

It will be understood that if all of the hydraulic cylinders and drives of the present invention are driven from a single source of hydraulic fluid, suitable flow dividers are provided in the hydraulic fluid drive lines to ensure that the fluid will be supplied in the correct proportions to the various hydraulically driven devices.

Various modifications of the present invention will be apparent to those skilled in the art without departing from the scope of the present invention. For example, the connection between the frame and the traction means may be in the form of a break-away fifth wheel device wherein one of the elements of the fifth wheel assembly is mounted at the frame and the other element is mounted on the sub-frame. In a further modification, the traction means of FIGS. 6 and 7 could be arranged to pull the various sections of the frame if required.

From the foregoing it will be apparent that the present invention provides a traction device which when used in combination with a small tractor is capable of performing work previously requiring a large and powerful tractor.

The embodiments of the invention in which an exclusive property or privilege is claimed are defined as follows:

1. A trailer type ground cultivating device comprising,
   a. a frame,
   b. ground cultivating means mounted on said frame and operable in response to movement of the frame in a cultivating path to cultivate soil,
   c. hitch means for releasably connecting said frame to a tractor,
   d. a soil traction member mounted on said frame in a soil engaging operative position and aligned with said frame for movement with said frame in said cultivating path,
   e. hydraulic drive means mounted on said soil traction means for driving said soil traction member,
   f. connecting means for connecting said hydraulic drive means to a hydraulic power source carried by said tractor.

2. A trailer type ground cultivating device as claimed in claim 1 wherein said soil traction member is mounted at the rear end of said frame so as to push the frame in use.

3. A trailer type ground cultivating device as claimed in claim 1 having wheel means at the front of said frame and a single castor-mounted wheel at the rear end of said frame.

4. A trailer type ground cultivating device as claimed in claim 1 including horizontally oriented pivot means mounting said soil traction member with respect to said frame to pivot freely about a horizontal axis which is transversely disposed with respect to the tilling direction.

5. A trailer type ground cultivating device as claimed in claim 4 including vertically oriented pivot means mounting said soil traction member to pivot about a vertical axis with respect to said frame, and releasable locking means for locking said soil traction member in said operative position and for releasing said soil traction member to pivot about said vertical axis to facilitate turning of said frame.

6. A trailer type ground cultivating device as claimed in claim 1 wherein said soil traction member includes a sub-frame pivotably mounted on said frame for movement about a vertical axis, releasable locking means for locking said sub-frame relative to said frame to prevent pivoting about said vertical axis, said locking means being releasable to permit said trailer traction means to pivot freely about said vertical axis.

7. A device as claimed in claim 4 including hydraulically adjustable load transfer means having one end secured to said frame and the other end secured to said traction device on opposite sides of said horizontal axis, said load transfer means being adjustable in length for transferring a portion of the trailer load to said traction member.

8. A device as claimed in claim 7 wherein said load transfer means includes first support bracket means mounted on and projecting upwardly from said frame, and second support bracket means mounted on said traction device, said first and second bracket means being located on opposite sides of said horizontal axis and extendible hydraulic cylinder means extending between said pair of brackets, and means for supplying hydraulic fluid to said extendible cylinder to effect the required load transfer.

9. A trailer type ground tilling device comprising,
a. a frame,
b. ground tilling members mounted on said frame and operable in response to movement of the frame in tilling path to till the soil,
c. hitch means for releasably connecting said frame to a tractor,
d. a soil traction member mounted on said frame in a soil engaging operative position and aligned with said frame in said tilling path,
e. hydraulic drive means mounted on said soil traction means for said soil traction member,
f. connecting means for connecting said hydraulic drive means to a hydraulic power source carried by said tractor.

10. A trailer type ground tilling device as claimed in claim 9 including vertically oriented pivot means pivotably mounting said traction means rearwardly of said frame for movement about a vertical axis, releasable locking means for releasing said soil traction member from said operative position to permit said soil traction device to pivot with respect to said frame to facilitate turning of said frame.

11. A trailer type ground cultivating device as claimed in claim 1 including pivot means for pivotably connecting said soil traction member to said frame to permit said soil traction member to pivot about a vertical axis to release said soil traction member from said operative position and releasable locking means for normally retaining said soil traction member in said operative position.

12. A trailer type ground cultivating device as claimed in claim 1 in which said soil traction member has a traction tread formed with a plurality of substantially transversely extending lugs which are circumferentially spaced from one another a distance at least equal to the height of the lugs.

13. A trailer type ground cultivating device as claimed in claim 1 in which said soil traction member is a wheel.

14. A trailer type ground tilling device as claimed in claim 9 in which said frame is a plow frame.

15. A trailer type ground tilling device as claimed in claim 14 wherein said ground tilling members are plow blades arranged on said frame to sequentially form a plurality of side-by-side furrows.

16. A trailer type ground tilling device as claimed in claim 9 having a plurality of ground engaging traction-free support wheels adjustably mounted on said frame, said wheels being adjustable relative to said frame to control the height of said ground tilling members relative to the soil.

17. A trailer type ground tilling device as claimed in claim 16 wherein said soil traction member is mounted to ride in the last furrow formed by said ground tilling members in use.

18. A trailer type ground tilling vehicle comprising, a. a plow frame having a front end and a rear end,
b. a plurality of plow blades operatively mounted on said frame,
c. support wheel means mounted at the front end of said plow frame,
d. a sub-frame consisting of a first portion pivotably mounted at the rear end of said frame to pivot about a generally vertical axis and a second portion pivotably mounted on said first portion to pivot about a generally horizontal transversely extending axis, said second portion projecting rearwardly from said first portion,
e. a soil traction wheel member mounted for rotation in said second portion of said sub-frame, said soil traction wheel member having a tread surface formed with a plurality of widely spaced deep traction lugs,
f. load transfer means extending between said first and second portions of said sub-frame for transferring a predetermined portion of the load to said soil traction wheel member,
g. releasable locking means for locking said sub-frame in a first operative position relative to said frame to retain said soil traction wheel means in a soil engaging operative position for movement in the required tilling direction, said locking means being releasable to permit said sub-frame and said soil traction wheel means to pivot about said vertical axis to facilitate turning of said frame, h. hydraulic drive means mounted in said wheel means and connecting means for connecting said hydraulic drive means to a hydraulic power source mounted on a tractor and coupling means for connecting the front end of said trailer to a tractor.

19. A trailer type ground tilling device as claimed in claim 18 in which said wheel has a traction tread diameter of at least 48 inches.

20. A trailer type ground tilling device as claimed in claim 19 wherein said soil traction wheel has a traction tread width of at least 12 inches.

21. A trailer type soil cultivator for cultivating soil as it is trailed in a predetermined cultivating path by a tractor comprising,
   a. a frame consisting of at least two sections,
   b. soil cultivating means mounted on each of said sections,
   c. coupling means connecting said frame sections in a side-by side relationship so as to cultivate adjacent tracks of soil in response to movement of said frame in said cultivating path,
   d. hitch means for connecting a first of said frame sections to a tractor,
   e. a soil traction member pivotably mounted on at least one frame section other than said first frame section for movement with respect to said frame about a vertical axis, and releasable locking means for locking said traction member in a soil engaging operative position aligned with the frame section on which it is mounted for movement with said frame in said cultivating path, said locking means being releasable to facilitate turning of said frame,
   f. hydraulic drive means mounted on said soil traction means for driving said soil traction means,
   g. connecting means for connecting said hydraulic drive means to a hydraulic power source.

22. A trailer as claimed in claim 21 wherein said frame consists of a plurality of sections and including soil traction means mounted on at least some of said sections other than said first section.

23. A trailer as claimed in claim 22 including traction means mounted on all of said frame sections other than said first section.

24. A trailer as claimed in claim 22 including traction means mounted on said first frame section.

25. A trailer as claimed in claim 22 wherein said frame consists of at least three sections, said first section being located between two other sections such that at least one other section projects outwardly from each opposite end of said first section.

26. A trailer as claimed in claim 25 including traction means mounted on all of said frame sections other than said first section.

27. A trailer as claimed in claim 26 including traction means mounted on said first section.

28. A trailer as claimed in claim 25 wherein said frame section coupling means is partially releasable to permit said other frame members to pivot rearwardly from said side-by-side position with respect to said first frame member to a position disposed rearwardly from and in substantial alignment with said first frame member.

29. A device as claimed in claim 9 including load transfer means having one end secured to said frame and the other end secured to said traction device for transferring a portion of the trailer load to said traction member.

* * * * *